(12) United States Patent
Cork et al.

(10) Patent No.: US 6,618,505 B2
(45) Date of Patent: Sep. 9, 2003

(54) METHOD, APPARATUS AND COMPUTER PROGRAM PRODUCT FOR DETERMINING SHIM SHAPE

(75) Inventors: Glen P. Cork, Wichita, KS (US); Ronald G. Lane, Wichita, KS (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/800,026

(22) Filed: Mar. 6, 2001

(65) Prior Publication Data

US 2001/0046323 A1 Nov. 29, 2001

Related U.S. Application Data

(60) Provisional application No. 60/188,113, filed on Mar. 9, 2000.

(51) Int. Cl.$^7$ .......................... G06K 9/46; G01B 21/00; G06F 19/00
(52) U.S. Cl. .................. 382/190; 382/191; 382/203; 382/152; 73/1.79; 73/1.81; 700/182
(58) Field of Search .................................. 382/203, 106, 382/108, 154, 204, 201, 100, 141, 152; 356/625–640; 250/559.19–559.28; 73/1.81, 865.8; 33/302; 700/160, 163, 182; 702/155, 156, 167, 1

(56) References Cited

U.S. PATENT DOCUMENTS

| | | | |
|---|---|---|---|
| 4,649,752 A | * 3/1987 | Turner ........................ | 73/760 |
| 4,663,858 A | * 5/1987 | Mahoney .................... | 33/542 |
| 4,744,153 A | * 5/1988 | Brand ........................ | 33/517 |
| 4,814,691 A | 3/1989 | Garbini et al. | |
| 4,814,703 A | 3/1989 | Carr et al. | |
| 4,841,224 A | 6/1989 | Chalupnik et al. | |
| 4,848,137 A | 7/1989 | Turner et al. | |
| 4,935,700 A | * 6/1990 | Garbini et al. .............. | 324/687 |
| 4,993,165 A | * 2/1991 | French et al. ................ | 33/606 |
| 5,033,014 A | * 7/1991 | Carver et al. ................. | 703/1 |
| 5,106,290 A | 4/1992 | Carver et al. | |
| 5,129,010 A | * 7/1992 | Higuchi et al. .............. | 382/154 |
| 5,189,377 A | * 2/1993 | Rhoades et al. ............ | 324/662 |
| 5,251,156 A | 10/1993 | Heier et al. | |
| 5,312,211 A | 5/1994 | Rodriguez | |
| 5,385,050 A | 1/1995 | Roberts | |
| 5,506,682 A | * 4/1996 | Pryor ........................ | 356/623 |
| 5,510,625 A | * 4/1996 | Pryor et al. ............ | 250/559.23 |
| 5,546,008 A | * 8/1996 | Sminchak et al. .......... | 324/690 |
| 5,642,293 A | * 6/1997 | Manthey et al. .............. | 702/42 |
| 5,696,687 A | 12/1997 | DeMotte et al. | |
| 5,796,856 A | * 8/1998 | Graff et al. ................. | 382/108 |
| 5,805,289 A | * 9/1998 | Corby et al. ................. | 356/613 |
| 5,963,660 A | 10/1999 | Koontz et al. | |
| 5,999,265 A | 12/1999 | Dalancon et al. | |

FOREIGN PATENT DOCUMENTS

| | | |
|---|---|---|
| EP | 0 308 539 A1 | 3/1989 |
| EP | 0 957 335 A2 | 11/1999 |

OTHER PUBLICATIONS

Copy of PCT International Search Report for PCT/US01/07470, completed Jul. 19, 2001.

* cited by examiner

*Primary Examiner*—Bhavesh M. Mehta
*Assistant Examiner*—Aaron Carter
(74) *Attorney, Agent, or Firm*—Alson & Bird LLP

(57) ABSTRACT

A method and apparatus for determining a shape of a shim that can be inserted between a first body, such as a strut torque box, and a second body, such as a torque box skin, is disclosed. The strut torque box is marked with a plurality of retro-reflective markers at the desired locations needing to be shimmed. The positions of the markers are measured using digital photogrammetry equipment yielding a plurality of measured points. The measured points define a surface of the first body. The locations of the measured points are transformed relative to a surface of the second body to yield a profile of the shape of the shim. The present method and apparatus have the advantage of considerably reducing the labor required for manual shim measurement using gauges by allowing multiple shim points to be measured simultaneously and without the pre-assembly of the strut torque box and torque box skin.

42 Claims, 8 Drawing Sheets

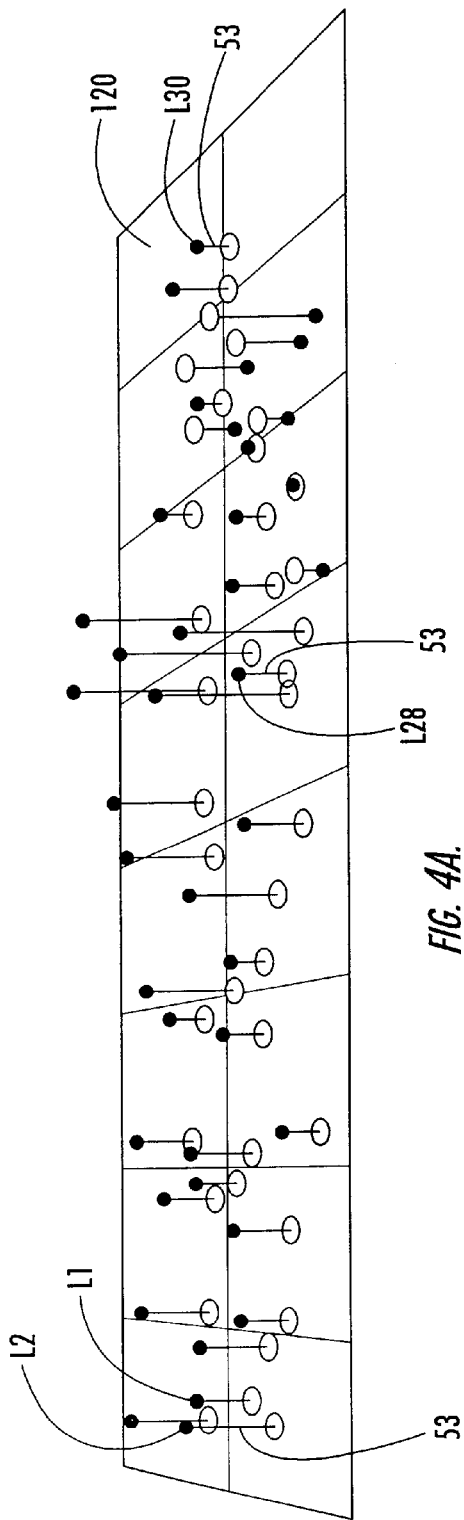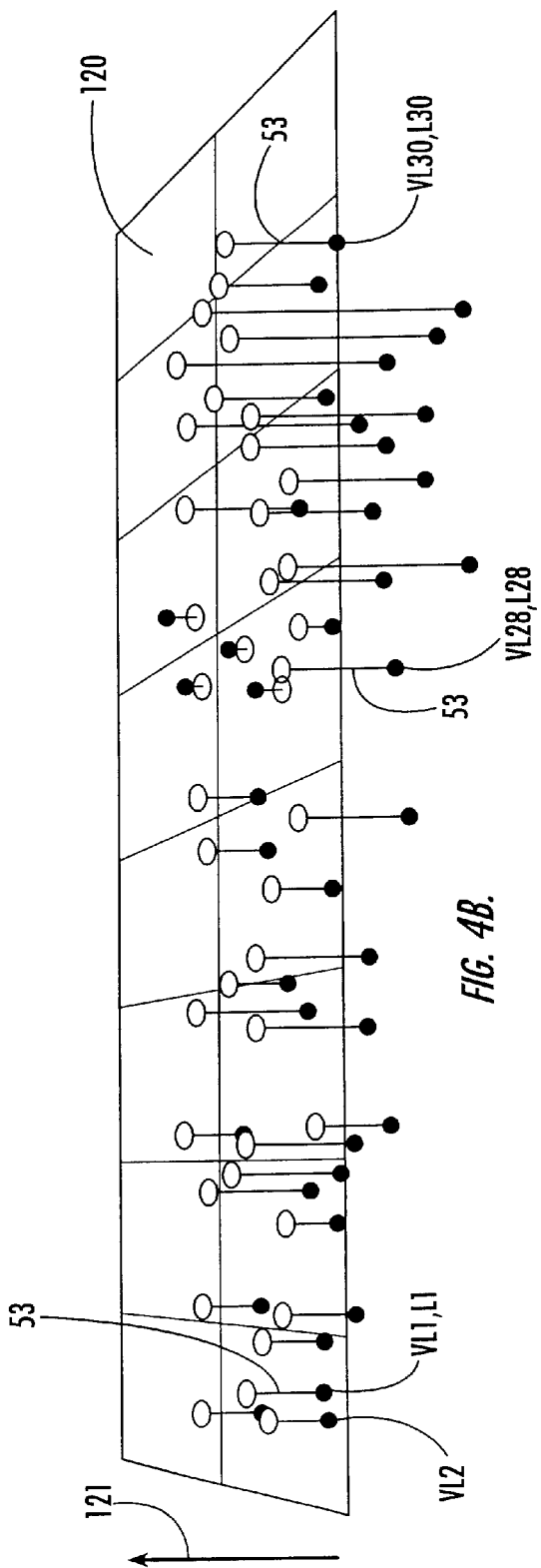

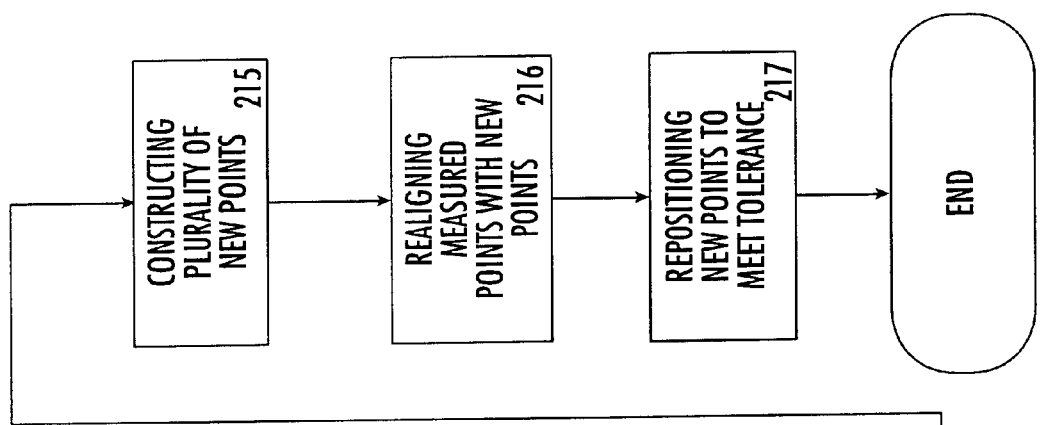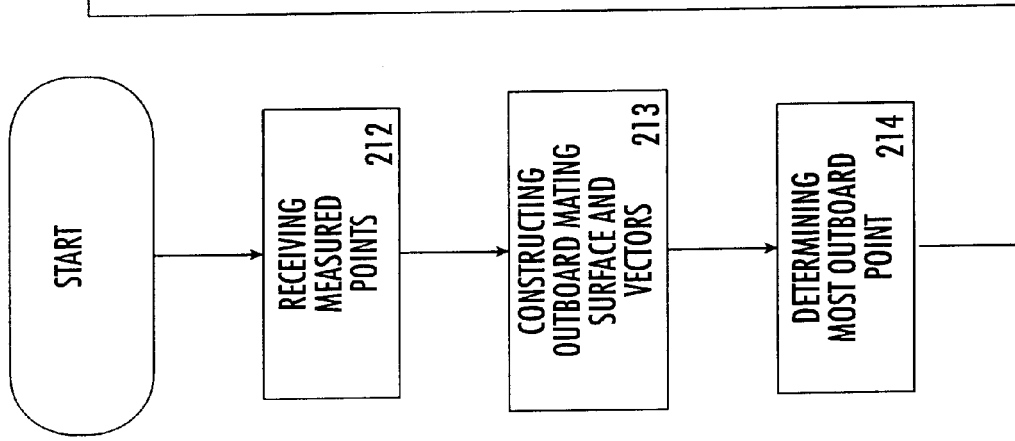
FIG. 7.

METHOD, APPARATUS AND COMPUTER PROGRAM PRODUCT FOR DETERMINING SHIM SHAPE

CROSS-REFERENCE TO RELATED APPLICATION

The present application claims priority from U.S. Provisional Application No. 60/188,113 entitled "Shim Thickness Determination," and filed on Mar. 9, 2000 the contents of which are incorporated herein by reference.

FIELD OF THE INVENTION

This invention relates to the process of shimming, and more particularly, to a process of determining the shape and thickness of a shim.

BACKGROUND OF THE INVENTION

Shims, also called fillers, are used to fill voids discovered during an assembly process. Voids are formed by the misalignment of parts during assembly or by the incorrect manufacture of the parts being assembled. Although mostly used on an informal basis during manufacturing, some shims are called out on drawings as part of the manufacturing process. Filling voids between mating surfaces on assembled parts results in a more structurally sound assembly.

Shims are used throughout the aerospace industry to compensate for part variation due to the complex aerodynamic shapes of various assembled parts. An example of the shimming within the aerospace industry is at the point where the skin of the airplane strut is attached to a torque box. Currently, the skin is moved into place, and shim thickness is measured using a feeler gauge. Use of the feeler gauge requires that the skin and the strut torque box be assembled and that the gauge be inserted between a pair of mating surfaces on the strut torque box and skin. When a feeler gauge is used, a range of gauges, and multiple measurement attempts, are usually required until the correct thickness is determined because of tight space constraints within the assembled parts. Once three or four locations associated with a shim are measured, the shim is constructed by hand. There are approximately 116 shims required in each strut torque box to torque box skin assembly. Because each shim must be measured for and constructed individually, it typically takes 100 to 200 man-hours to shim each strut torque box and skin assembly.

Consequently, there is a need for a method and apparatus capable of determining the shape and thickness of a shim with efficiency and accuracy.

SUMMARY OF THE INVENTION

The present invention discloses a method and apparatus for determining the shape and thickness of a shim to be fit between two surfaces, a strut torque box and torque box skin for example. The method and apparatus allow the simultaneous measurement of a plurality of retro-reflective targets on the strut torque box using digital photogrammetry equipment. The targets are located on the shim surfaces of the strut torque box and the measurements yield a plurality of measured points. The locations of these measured points are transformed to yield the shape of the shim required at each shim location without assembly of the strut torque box and torque box skin.

In one embodiment, the present invention includes an apparatus for determining the shape of the shim that can be inserted between a first body and a second body in an interference fit. The apparatus includes a processing element for receiving a plurality of measured points that define a surface of the first body. The processing element also uses an engineering surface and creates a vector passing through respective points of a group of the measured points and normal to the engineering surface. The processing element determines, for each point of the group, a distance between the engineering surface and a point that is local to the respective point in the group that is most outboard from the engineering surface. The processing element also constructs a plurality of new points with each new point associated with a respective point of the group and displaced the respective distance along the respective vector. The processing element further constructs a second surface of the second body from the plurality of new points so that the shape of the shim is defined between the plurality of the measured points and the first surface.

In another embodiment, the present invention includes an apparatus for determining the shape of a shim that can be inserted between a first body and a second body. The apparatus comprises a processing element for receiving a plurality of the measured points that define a first surface of the first body. The processing element also uses an outboard mating surface of the second body and creates a vector passing through each point of a group of the measured points and normal to the outboard surface. The processing element determines, for each point of the group, a distance between the outboard mating surface and a point that is local to the respective point in the group and is most outboard from the outboard surface. The processing element also constructs a plurality of new points with each new point associated with a respective point of the group and displaced the respective distance along the respective vector. The processing element realigns the measured points until each point of the group of the measured points is coincident with each new point on the same vector so that the shape of the shim is defined between the plurality of measured points and the outboard mating surface.

In another embodiment, the apparatus includes a plurality of targets each marking a position for the shim on the first body and a measurement device positioned to measure the plurality of targets and construct the plurality of points from the measured targets. The measurement device can be a photogrammetry device measuring the plurality of targets by capturing an optical image. Preferably, the plurality of targets are retro-reflective targets having a contrast detectable by the photogrammetry device. The photogrammetry device may include one, or a plurality, of cameras.

In yet another embodiment, the processing element repositions the new points until the measured points protrude less than an engineering tolerance into either the second surface or the outboard mating surface. Repositioning configures the shim to form an interference fit between the first and second bodies.

In another embodiment, the second body includes a tool-locating detail and the processing element constructs the outboard mating surface from a position of the tool locating detail and a known displacement of the outboard mating surface with respect to the tool locating detail. In one aspect, the tool locating detail is located on the hinge of a thrust reverser of a jet aircraft engine.

In still another embodiment, the present invention includes an apparatus for determining the shape of a shim that can be inserted between a first body and a second body. The apparatus comprises a plurality of targets, a measuring device and a processing element. The plurality of targets are positioned at a plurality of shim points on the first body. The measuring device is positioned to measure the plurality of targets and created a plurality of measured points corresponding to the plurality of targets. The plurality of points define a first surface on the first body. The processing element receives the plurality of measured points. The processing element uses a second surface and transforms the locations of the measured points with respect to the second surface so that the thickness of the shim is defined between the plurality of points and the second surface. In one aspect, the transformation performed by the processing element is a maximum material best fit with constraints on the plurality of measured points to one side of the second surface of the second body.

The present invention has the advantage of allowing the calculation of multiple shim shapes with a single set of measurements. Also, the present invention allows for the shim shape to be determined without assembly of the component parts. These efficiencies result in a large decrease in the time and effort required for shim installation, particularly in aerospace applications which require the assembly of large and complex shapes.

BRIEF DESCRIPTION OF THE DRAWINGS

FIG. 4A is a schematic of a plurality of measured points projected onto a plane by a processing element in another embodiment of the present invention;

FIG. 4B is a schematic of the plurality of measured points in FIG. 4A transformed to one side of the plane using the processing element;

FIG. 7 is a flowchart of a process of the present invention for determining the shape of a shim by realigning a group of measured points to a group of new points.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
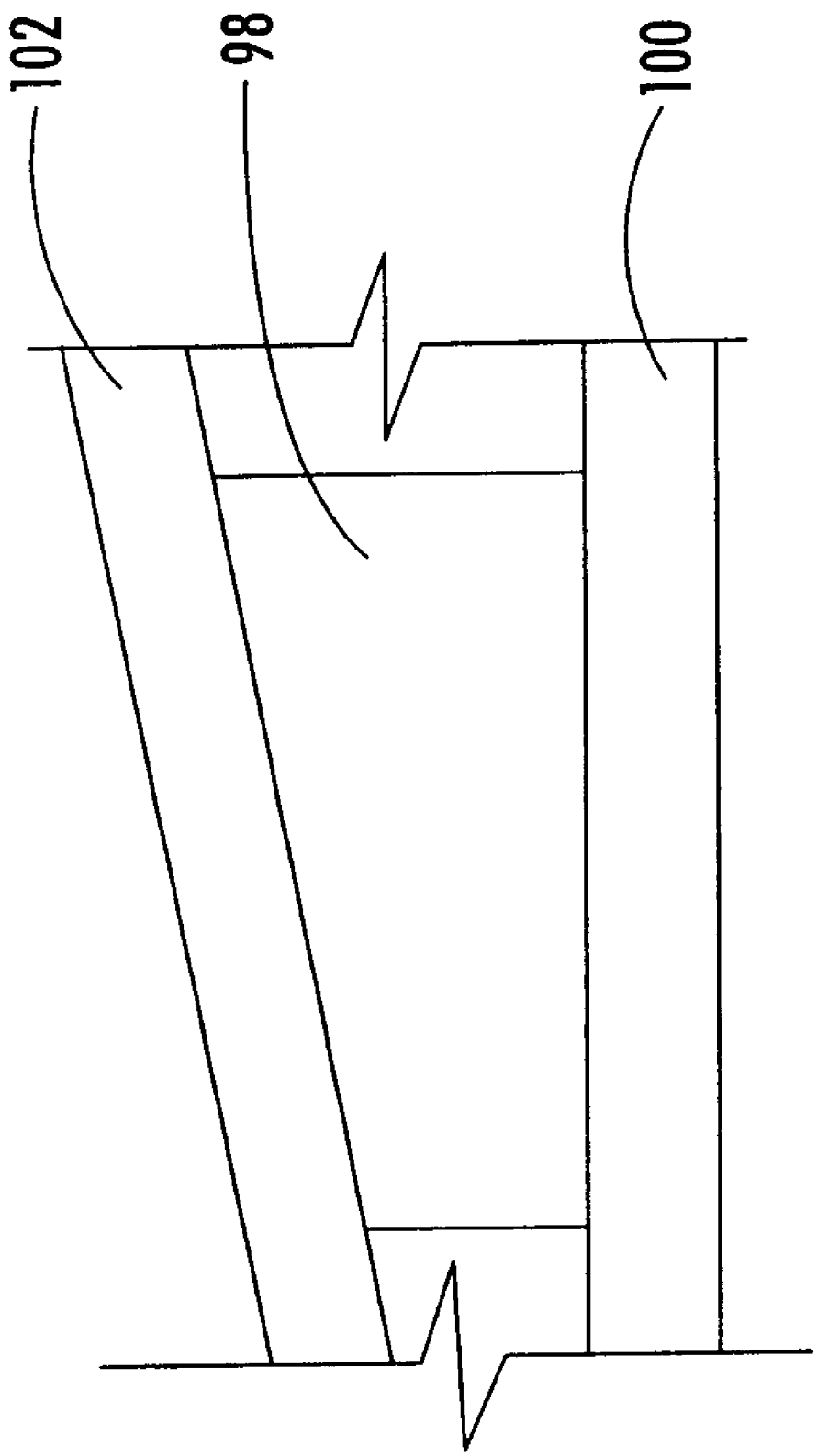
FIG. 1 is a schematic diagram of a shim constructed using a shape determined by the present invention.

As shown in FIG. 1, a shim 98 is positioned between two surfaces. In this example, the first surface is defined as the outer surface of a first body, in this case a strut torque box 102. The second surface is defined as the inner surface of a second body, in this case a torque box skin 100. However, the shim 98 can be positioned between a wide variety of other surfaces, if so desired. Additionally, the shim may be positioned between more than two bodies and may accordingly have a more complex design in certain circumstances. The shim 98 may be any shape or contour, and often has a rectangular or square footprint. To determine the shape of the shim, a single point or a series of points may be measured, as described below, for each shim position depending upon the desired accuracy of shim construction. These points are thereafter utilized to construct the shape of the shim.

Figure 2:
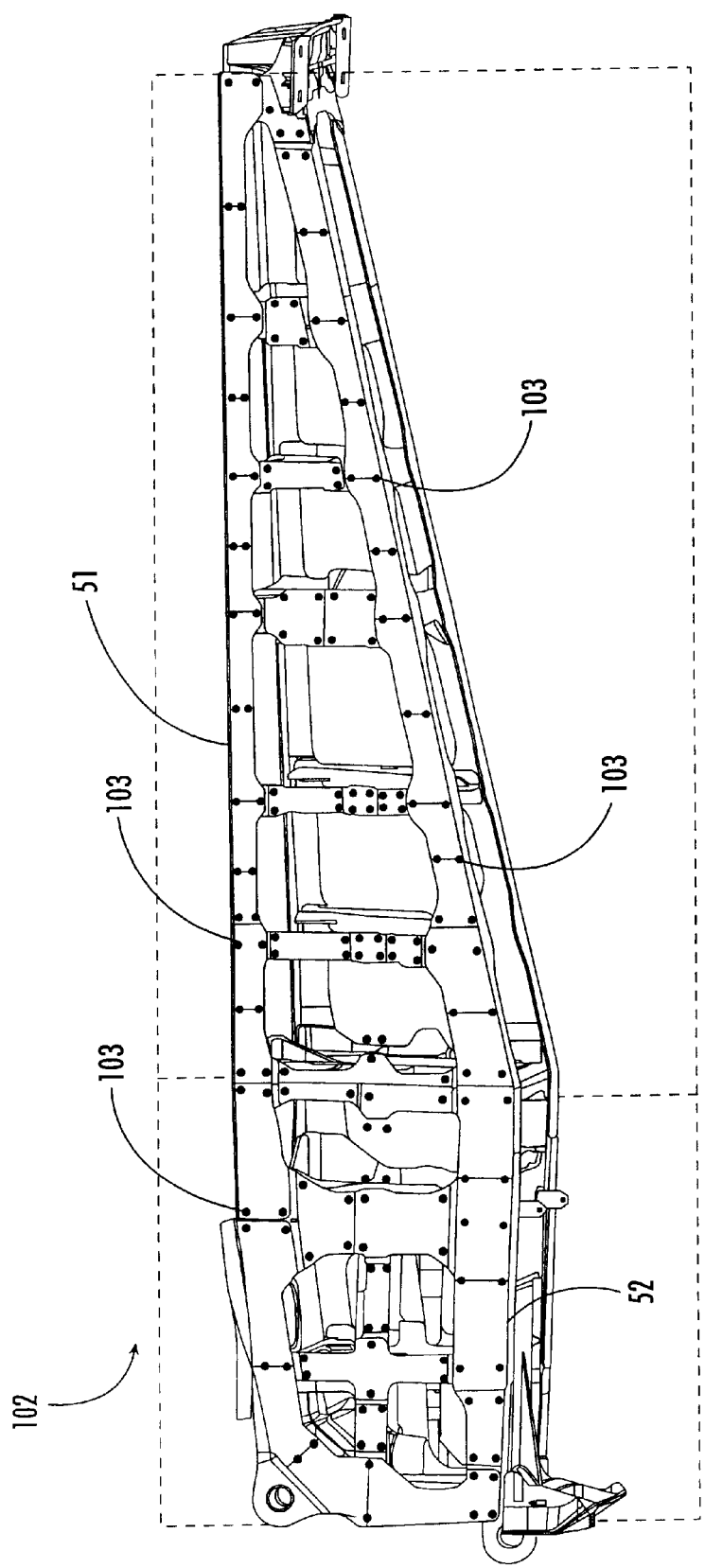
FIG. 2 is a perspective view of a strut torque box marked with targets that indicate shim point locations for measurement using the present invention.

According to the present invention, the shim points can be measured during the course of a single measurement, as opposed to conventional methods that require multiple measurements for each shim. Measurement of the shim positions upon one of the surfaces, such as the strut torque box 102, is performed using a measuring device. In particular digital photogrammetry equipment can be used as the measuring device, preferably from Geodetic Services, Inc. of Melbourne, Fla. The shim points are targeted by the digital photogrammetry equipment using retro-reflective targets 103 applied at each individual shim point. FIG. 2 shows the measurement locations of the reflective targets 103 on one side of the strut torque box 102, and shows each shim position segmented by lines. A single camera may be used and typically takes up to 80 pictures of the torque box from 80 different positions. In a preferred embodiment, four cameras in different positions are used in a real time configuration for quick and accurate measurement. The result of the measurements yield three-dimensional coordinates for a plurality of points at each shim location, which are used to determine the shape and thickness of the shims needed to secure the skin to the strut torque box in this example. Other methods can be used to measure the shim points such as a linkage with a stylus or radio frequency equipment, but digital photogrammetry is preferred due to the quickness of the measurement and its accuracy. The markers may be placed using other materials, such as spray dots, LED's and the like, but retro-reflective markers yield an excellent contrast for easy detection by the photogrammetry equipment under controlled lighting.

In a first embodiment, the process for determining the thickness of shims uses a planar based analysis. Although the first embodiment is illustrated as applied to an engine strut used in the aerospace industry, it is also preferred for applications that require shims in areas that are relatively flat or planar in nature. A strut hangs from the wing of an aircraft and includes the strut torque box 102 to which an engine is to be mounted. Each side of the strut torque box 102 comprises two planes, a forward plane 51 and an aft plane 52.

The number of points measured by the photogrammetry device may be varied as desired, but in the present embodiment 55 points (L111–L165) are measured on the aft plane 52 and 110 points (L1–L110) are measured on the forward plane 51. The groups of measured points are used to determine the shape of a plurality of the shims 98, as shown in block 202 of FIG. 6. In the present example, four points are used, one for each corner, to determine the shape and thickness of each shim. Typically, the number of measured points may be varied based on the complexity of the surface and the level of precision required. Additional points may be used for larger or more complicated shims and less points for less complicated shims. The points are referenced to hard tooling landmarks, such as the hinges of the strut torque box (not shown), that are detected by the photogrammetry device while measuring the measured points. The hard tooling landmarks allow the measured points (L) to be transformed into a coordinate system having an engineering surface 104 that is a model, typically obtained from a CAD or similar system, of either the forward or aft planes 51, 52, as shown in block 203 of FIG. 6. This type of transformation is common to the art and is therefore not described herein in any further detail.

Figure 3:
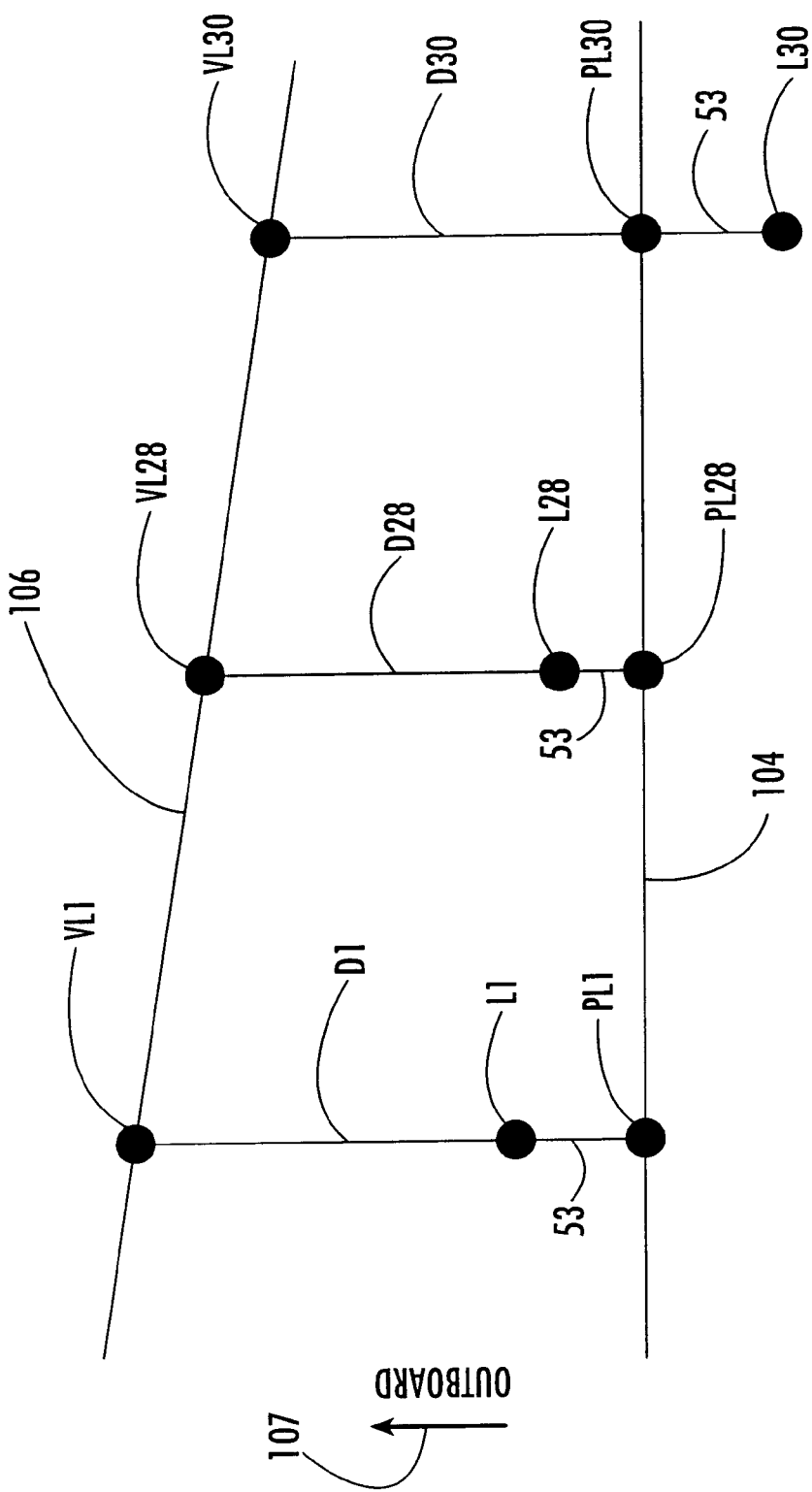
FIG. 3 is a schematic illustrating the creation of a plurality of points and the construction of a planar surface according to one embodiment of the present invention.

In the example of FIG. 3, three points L1, L28 and L30 are selected from the cloud of measured points (L) to form a surface 106. As described above, however, additional points could be selected if so desired. Together, the surface 106 and the measured points (L) define the shape of the shim 98, as described below. The three points preferably have a good distribution across the engineering surface 104. For instance, the most outboard point is selected near each opposing edge and a third in the middle of the engineering surface 104.

As shown in FIG. 3, each measured point is not itself used to construct the plane 106, but rather a new point (VL) on the same vector (described below) is constructed and that new point is used to construct the plane. The new point (VL) is constructed by defining a line that passes through the measured point (L) and is normal to the engineering surface 104. A point (PL) is created at the intersection of the line and the engineering surface 104. A vector 53 is created from the point (PL) on the engineering surface and the measured point (L). Finally, a new point (VL) is created using a predetermined outboard displacement along the same vector 53 as the designated measured point (L) and the surface point (PL).

Basically, the top and bottom surfaces of the shim 98 are modeled by the engineering surface 104 and the plane 106. The engineering surface 104 represents the mating surface of the strut torque box 102. The plane 106 represents the mating surface of the torque box skin 100 offset by an engineering tolerance to slightly thicken the shim 98 so that it can be lodged between the strut torque box and torque box skin in an interference fit.

Figure 6:
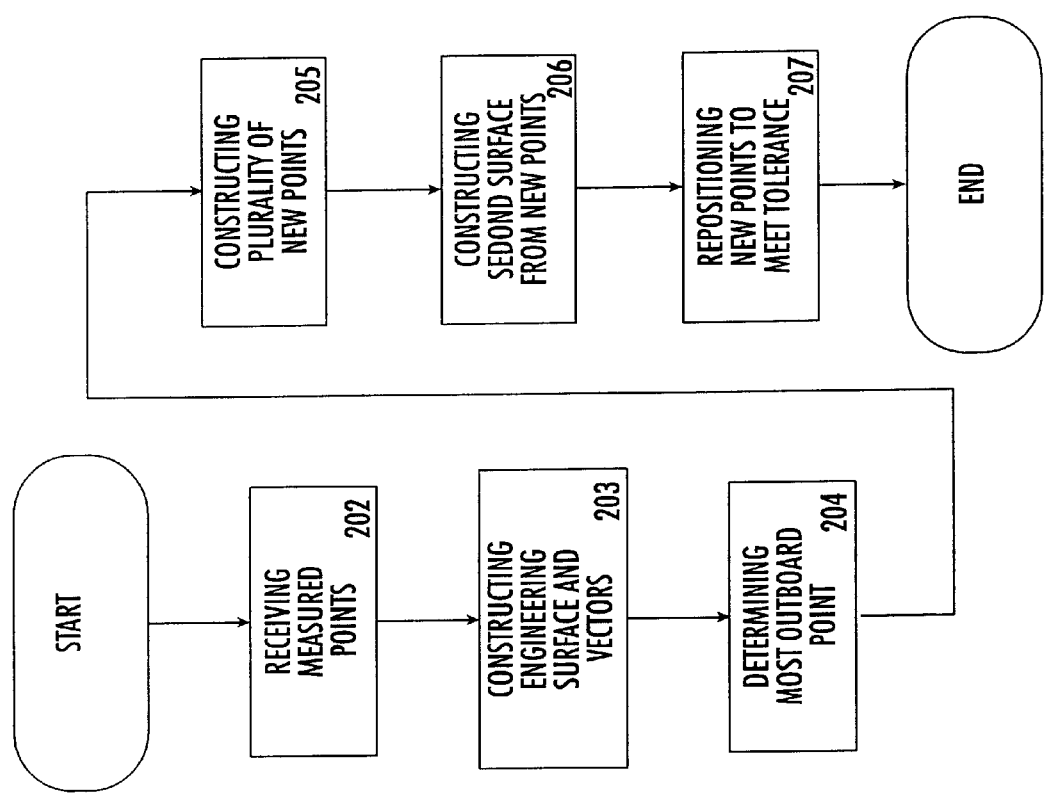
FIG. 6 is a flowchart of a process of the present invention for determining the shape of a shim by constructing a new surface from a group of new points.

In a preferred embodiment, the outboard displacement from each designated measurement point (L) to the respective new point (VL) is separately determined for each designated measurement point based upon the distance between the engineering surface 104 and the outboard-most point in a region around the respective measurement point, (e.g., L1, L28, and L30), as shown in block 204 of FIG. 6. The size and location of the region around each designated measurement point can be defined by an algorithm or manually by a person skilled in the art. If three points are used to create the plane, then three equal regions are used. Although not necessary for the practice of the present invention, the outboard-most points in each local region can be selected to also be the designated measuring points (L), such that the displacement of the new points (VL) from the designated measuring points is the same as the displacement of the designated measuring points from the engineering surface 104 minus the engineering tolerance.

With reference to FIG. 3 and as shown in block 205 of FIG. 6, a first new point VL1 is constructed a distance D1 away from the measured point L1 along the vector 53 defined by the points PL1 and L1. As noted above, D1 is equal to the displacement of the most-outboard point in the region around L1 from the engineering surface 104. New points VL28 and VL30 are created in a similar manner from displacements D28 and D30, respectively. The planar surface 106 is then constructed and fit to the three new points VL1, VL28 and VL30, as shown in block 206 of FIG. 6. The three new points are repositioned in increments, changing the orientation of the planar surface 106, until all of the measured points (L) protrude less than a predetermined engineering tolerance into the surface 106 in the direction of the arrow 107 in FIG. 3. The increments are determined by observing how much the plurality of points project into the plane. This is achieved by measuring the point-to-plane distance for all points, e.g., L1–L110. Repositioning the three new points adjusts the planar surface 106 to thicken the shim 98 and provide an interference fit of a predetermined amount.

In the present example, the engineering requirements for the strut torque box 102 and torque box skin 100 allow for a 0.005 inch interference fit. This means that any measured point (L1–L110 or L111–L165) can protrude into the plane 106 by as much as 0.005 inches. To meet the requirement, the locations of the new points VL1, VL28, and VL30 are moved by small variations and plane 106 is redefined until all measured points (L1–L110 or L111–L165) protrude no more than 0.005 inches into the plane 106 created by the new points, as shown in block 207 of FIG. 6.

The distance between all of the measured points (L1–L110 or L111–L165), that are associated with the shim location and the plane 106 is measured. The distance from the plane 106 to the measured points is the shape or thickness of the shim 98 at that particular location. A report of the results generated is given to a mechanic or shim milling machine for manufacture of the shim 98.

Construction of planes, measured points and other data manipulation are performed by a processing element. The processing element can include, without limitation, a single microprocessor, such as in a personal computer, multiple processors, such as in a mainframe, a UNIX workstation or some collection of software, firmware, hardware, or some combination thereof. Part or all of the data manipulation may be performed by a processing element included with the measurement equipment (e.g., the digital photogrammetry equipment) or in cooperation with other processors.

In one embodiment, for example, a computer program product serves as the processing element. The computer program product includes a computer-readable storage medium having computer-readable program code means, such as a series of computer instructions embodied in the computer-readable storage medium for determining the shape of a shim that can be inserted between a first body and a second body.

Figure 8:
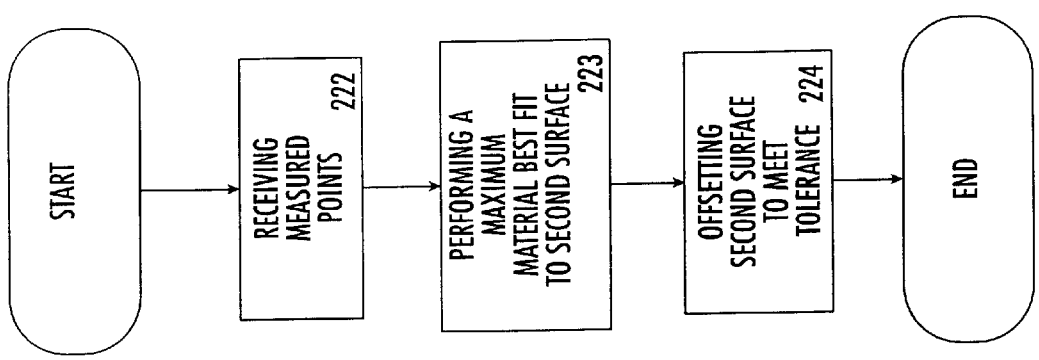
FIG. 8 is a flowchart of a process of the present invention for determining the shape of a shim by performing a maximum material best fit to a surface.

In this regard, FIGS. 6, 7, and 8 are flowchart illustrations of methods, systems and program products according to the invention. It will be understood that each block or step of the flow chart, and combinations of blocks or steps in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart flow block(s) or step(s). The computer program instructions may also be loaded onto a computer or other programmable apparatus to cause of series of operational steps to be performed on the computer or other programmable apparatus to produce a computer implemented process such that the instructions which execute on the computer or other programmable apparatus provide steps for implementing the functions specified in the flowchart flow block(s) or step(s).

Accordingly, blocks or steps of the flowchart support combinations of means for performing the specified functions, combinations of steps for performing the specified functions and program instruction means for performing the specified functions. It will also be understood that each block or step of flowchart, and combinations of blocks or steps in the flowchart, can be implemented by special purpose hardware-based computer systems which perform the specified functions or steps, or combinations of special purpose hardware and computer instructions.

Another embodiment of the present invention uses a surface analysis method to determine shim thickness. Surface analysis provides more flexibility than the aforementioned planar analysis because it can be used on non-planar surfaces. There is no requirement that the plane constructed on each side of the strut torque box 102 must intersect the measured points (L1–L110 or L111–L165) within the allowable engineering interference.

In this embodiment, shim points are typically marked using retro-reflective markers which are measured in three-dimensions by photogrammetry equipment, as shown in FIG. 2 and block 212 of FIG. 7. The results of the measurements are projected to an inner mold line engineering surface that serves as an outboard mating surface 120, not on the strut torque box 102 as in the first embodiment, but on the torque box skin 100, as shown in block 213 of FIG. 7. Similar to the engineering surface 104, the outboard mating surface is a design surface, typically provided by a CAD or similar system, having a coordinate system into which the measured points (L) are imported. As in the first embodiment, three measured points are designated as measuring points (e.g., L1, L28, L30). Although more measuring points could be designated if desired. In the region around each designated measured point, the outboard-most measured point is selected and the distance between the point and the outboard mating surface 120 is noted, as shown in block 214 of FIG. 7. If there is a point L2 immediately adjacent to L1 for instance that is 0.050 inches outboard of the skin surface, and the point L2 is the outboard-most point in the region around L1, then the distance from L2 to the skin surface is noted.

FIG. 4A shows how each of the measured points are projected to outboard mating surface 120, as indicated by the open circles on surface 120. Once the distance between the locally outboard-most point and the outboard mating surface is determined for each of the three designated points, a new point (VL) is created along the vector 53 defined to extend in the inboard direction normal to the mating surface 120 and through a respective point (L), as shown in block 215 of FIG. 7. The new point (VL) is spaced from the designated measuring point in an inboard direction by the noted distance of the locally outboard-most point from the outboard mating surface 120, any engineering interference allowance (0.005 inches in this case).

With three new points VL1, VL28, VL30 created, all of the measured points in the entire measured data set (L1–L165) are realigned such that L1, L28, and L30 are coincident with VL1, VL28, and VL30, respectively, as shown in block 216 of FIG. 7. The distance between each measured point (L) and the outboard mating surface 120 of the torque box skin 100, is then re-measured to verify that no point extends more than 0.005 inches into the mating surface in the direction of arrow 121, as shown in block 217 of FIG. 7. FIG. 4B shows the results of the second set of point to surface 120 measurements as indicated by the lines. The distance of each measured point (L) from the outboard mating surface 120 is the thickness of the shim 98 at that location. As in the first embodiment, a report of the results generated is given to a mechanic or shim milling machine for manufacture of the shim 98.

It should be noted that this embodiment is different from the first embodiment in that the group of measured points are being moved with respect to the design surface. Basically, the new points (VL) are created and the measured points (L) are moved until the designated measured points overlap the new points. Moving the measured points changes their orientation with respect to the design surface. The relative positions and orientations of the measured points with respect to each other, however, are not changed. In the first embodiment, the surface is moved with respect to the measured points, which are fixed.

In yet another embodiment, the inner mold line of the outboard mating surface is again used to determine the shim thickness, as shown in FIG. 8. However, all measured points, as opposed to three selected measured points, are used to perform a "best-fit" to the outboard mating surface 120 of the torque box skin 100, as shown in blocks 222 and 223 of FIG. 8. The "best-fit" is not a normal least-squares best fit, but instead a "maximum-material condition best-fit," where all the measured points are best-fit to one side of the mating surface 120. The mating surface is offset by the allowable engineering interference (0.005 inches in this case) and the entire measured data set (L1–L110 or L111–L165) is used to determine the minimum shim thickness, as shown in block 224 of FIG. 8. Each measured point to surface thickness is the shim thickness at each measured location. The use of a maximum-material condition best-fit is not limited to planar shims.

Figure 5:
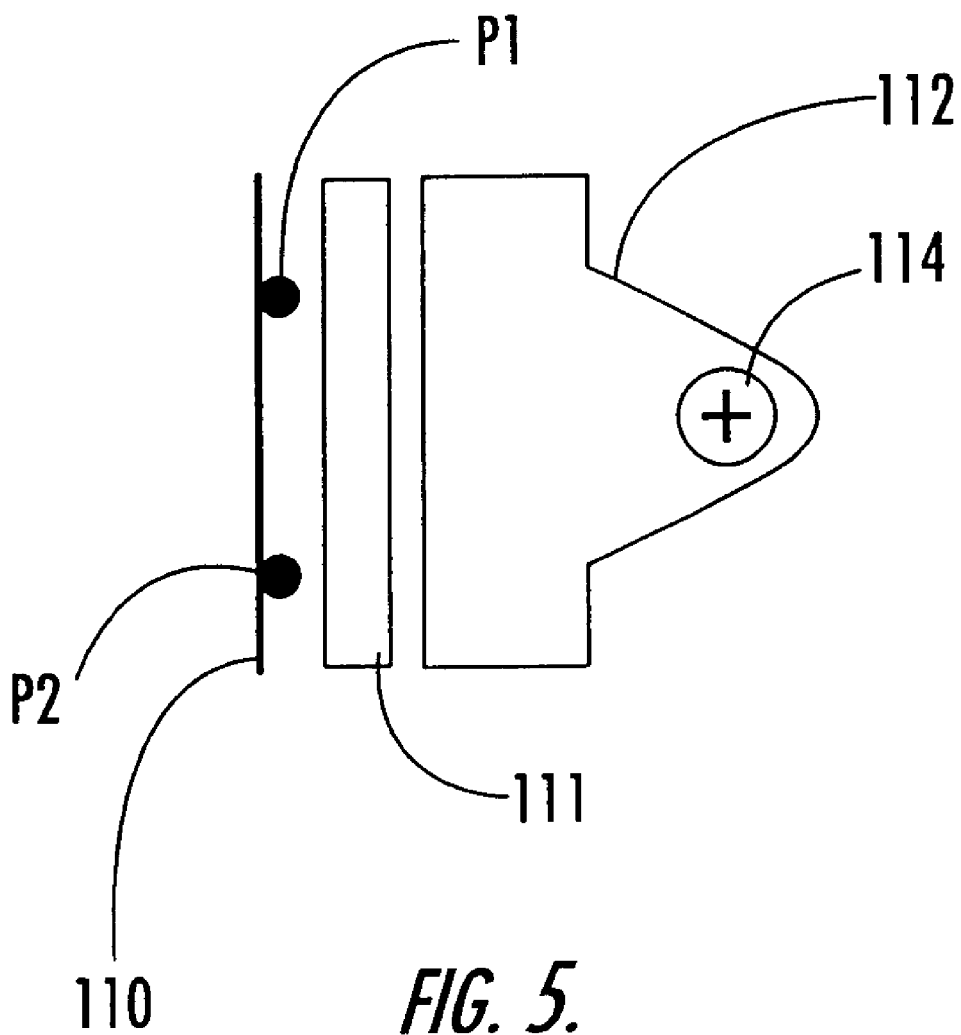
FIG. 5 is a schematic of a point to surface shim placed between a hinge of a thrust reverser and an outer mold line of a skin and having a thickness determined by another embodiment of the present invention.

In another embodiment, the measured points are not relocated. The shim thickness is determined by calculating the point to surface deviation. The method is particularly useful when a point-to-surface shim 111 is needed in an area where the surface location is critical. As shown in FIG. 5, a thrust reverser (TR) hinge 112 is installed on an outer mold line of the strut skin. The location of the hinge 112 is critical because the hole 114 of the hinge 112 is used to locate and install the thrust reverser. The TR hinge 112 is tool-located using a pin that goes through the tool-locating detail and through the TR hinge hole 114. The assumption made for this analysis is that the TR hinge 112 detail part is manufactured to exact engineering specifications. Using that assumption, the measurement equipment is used to measure points P1, P2 on the skin or outer mold line surface 110 at the locations where the TR hinges 112 are to be installed. The thickness of the shim is determined by calculating the distance between points P1, P2 and the TR hinge 112 mating surface. A report of the point-to-surface thickness information is given to a mechanic or shim milling machine for manufacture of the shim 111. The finished shim can be installed between the TR hinge 112 mating surface and the outer mold line surface 110.

The present invention has several advantages. One advantage, is that the time consuming process of measuring multiple shim points individually and by hand in tight spaces with a feeler gauge has been eliminated. The present invention allows all of the points to be measured simultaneously for multiple shims, saving upwards of 50% to 75% on measurement, manufacture and installation time. Another advantage is that the mating parts do not have to be pre-assembled for the measurements to be taken. Weight reduction is of considerable importance in aerospace applications. The weight of each shim is reduced because the algorithm minimizes the shim thickness, resulting in a 5 to 10 pound weight reduction for the entire strut.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for determining a shape of a shim that can be inserted between a first body and a second body, the apparatus comprising:
a processing element for receiving a plurality of measured points that define a surface of the first body, said processing element also using an engineering surface and creating a vector passing through respective points of a group of the measured points and normal to the engineering surface, said processing element determining, for each point of the group, a distance between the engineering surface and a point that is local to the respective point in the group and is most outboard from the engineering surface, said processing element also constructing a plurality of new points with each new point associated with a respective point of the group and displaced the respective distance along the respective vector, said processing element further constructing a second surface of the second body from the plurality of new points so that the shape of the shim is defined between the plurality of measured points and the first surface.

2. The apparatus of claim 1, further comprising a plurality of targets each marking a position for the shim on the first body and a measurement device positioned to measure the plurality of targets and construct the plurality of measured points therefrom.

3. The apparatus of claim 2, wherein the measurement device is a photogrammetry device measuring the plurality of targets by capturing an optical image.

4. The apparatus of claim 3, wherein the targets are retro-reflective targets having a contrast detectable by the photogrammetry device.

5. The apparatus of claim 3, wherein the photogrammetry device includes a plurality of cameras.

6. The apparatus of claim 1, wherein the first body is a strut torque box and the second body is a skin.

7. The apparatus of claim 1, wherein the group of points and the plurality of new points each comprises at least three measured points.

8. The apparatus of claim 7, wherein said processing element repositions the new points until the measured points protrude less than a predetermined engineering tolerance into the second surface so that the shape of the shim is configured to form an interference fit between the first and second bodies.

9. An apparatus for determining a shape of a shim that can be inserted between a first body and a second body, the apparatus comprising:
a processing element for receiving a plurality of measured points that define a surface of the first body, said processing element also using an outboard mating surface of the second body and creating a vector passing through each point of a group of the measured points and normal to the outboard surface, said processing element determining, for each point of the group, a distance between the outboard mating surface and a point that is local to the respective point in the group and is most outboard from the outboard surface, said processing element also constructing a plurality of new points with each new point associated with a respective point of the group and displaced the respective distance along the respective vector and said processing element realigning the measured points until each point of the group of the measured points is coincident with each new point on the same vector so that the shape of the shim is defined between the plurality of measured points and the outboard mating surface.

10. The apparatus of claim 9, further comprising a plurality of targets each marking a position for the shim on the first body and a measurement device positioned to measure the plurality of targets and construct the plurality of measured points therefrom.

11. The apparatus of claim 10, wherein the measurement device is a photogrammetry device measuring the plurality of targets by capturing an optical image.

12. The apparatus of claim 11, wherein the targets are retro-reflective targets having a contrast detectable by the photogrammetry device.

13. The apparatus of claim 12, wherein the photogrammetry device includes a plurality of cameras.

14. The apparatus of claim 9, wherein the first body is a strut torque box and the second body is a skin.

15. The apparatus of claim 9, wherein said processing element repositions the new points until the measured points protrude less than a predetermined engineering tolerance into the outboard mating surface so that the shape of the shim is configured to form an interference fit between the first and second bodies.

16. The apparatus of claim 9, wherein the second body includes a tool locating detail and said processing element constructs the outboard mating surface from a position of the tool locating detail and a known displacement of the outboard mating surface with respect to the tool locating detail.

17. An apparatus for determining a shape of a shim that can be inserted between a first body and a second body, the apparatus comprising:
a processing element for receiving a plurality of measured points that define a surface of the first body, said processing element performing a maximum material best fit on the plurality of measured points to one side of a second surface of the second body so that the shape of the shim is defined between the plurality of measured points and the second surface which is an engineering surface.

18. The apparatus of claim 17, wherein said processing element offsets the second surface by a predetermined engineering tolerance so that the shape of the shim is configured to form an interference fit between the first and second bodies.

19. The apparatus of claim 17, further comprising a plurality of targets each marking a position for the shim on the first body and a measurement device positioned to measure the plurality of targets and construct the plurality of measured points therefrom.

20. The apparatus of claim 19, wherein the measurement device is a photogrammetry device measuring the plurality of targets by capturing an optical image.

21. The apparatus of claim 20, wherein the targets are retro-reflective targets having a contrast detectable by the photogrammetry device.

22. The apparatus of claim 20, wherein the photogrammetry device includes a plurality of cameras.

23. The apparatus of claim 17, wherein the first body is a strut torque box and the second body is a skin.

24. A method of determining a shape of a shim that can be inserted between a first body and a second body, the method comprising:

receiving a plurality of measured points that define a surface of the first body;

using an engineering surface and creating a vector passing through respective points of a group of the measured points and normal to the engineering surface;

determining, for each point of the group, a distance between the engineering surface and a point that is local to the respective point in the group and is most outboard from the engineering surface;

constructing a plurality of new points with each new point associated with a respective point of the group and displaced the respective distance along the respective vector; and constructing a second surface of the second body from the plurality of new points so that the shape of the shim is defined between the plurality of measured points and the first surface.

25. The method of claim 24, further comprising the steps of marking a position for the shim on the first body, measuring positions of each of the plurality of targets and constructing the plurality of measured points from the positions of the plurality of targets.

26. The method of claim 25, wherein said measuring positions step includes capturing an optical image of the plurality of targets with a photogrammetry device.

27. The method of claim 24, further comprising the step of repositioning the new points until the measured points protrude less than a predetermined engineering tolerance into the second surface so that the shape of the shim is configured to form an interference fit between the first and second bodies.

28. A method of determining a shape of a shim that can be inserted between a first body and a second body, the method comprising:

receiving a plurality of measured points that define a surface of the first body;

using an outboard mating surface of the second body and creating a vector passing through respective points of a group of the measured points and normal to the outboard mating surface;

determining, for each point of the group, a distance between the outboard mating surface and a point that is local to the respective point in the group and is most outboard from the outboard mating surface;

constructing a plurality of new points with each new point associated with a respective point of the group and displaced the respective distance along the respective vector; and realigning the measured points until each point of the group of the measured points is coincident with each new point on the same vector so that the shape of the shim is defined between the plurality of measured points and the outboard mating surface.

29. The method of claim 28, further comprising the steps of marking a position for the shim on the first body, measuring positions of each of the plurality of targets and constructing the plurality of measured points from the positions of the plurality of targets.

30. The method of claim 29, wherein said measuring positions step includes capturing an optical image of the plurality of targets with a photogrammetry device.

31. The method of claim 24, further comprising the step of repositioning the new points until the measured points protrude less than a predetermined engineering tolerance into the outboard mating surface so that the shape of the shim is configured to form an interference fit between the first and second bodies.

32. A computer program product for determining the shape of a shim that can be inserted between a first body and a second body comprising a computer-readable storage medium having computer-readable program code embodied in said medium, the computer-readable program code comprising:

a first computer-readable program code portion for receiving a plurality of measured points that define a surface of the first body;

a second computer-readable program code portion for using an engineering surface and creating a vector passing through respective points of a group of the measured points and normal to the engineering surface;

a third computer-readable program code portion for determining, for each point of the group, a distance between the engineering surface and a point that is local to the respective point in the group and is most outboard from the engineering surface;

a fourth computer-readable program code portion for constructing a plurality of new points with each new point associated with a respective point of the group and displaced the respective distance along the respective vector; and a fifth computer-readable program code portion for constructing a second surface of the second body from the plurality of new points so that the shape of the shim is defined between the plurality of measured points and the first surface.

33. The computer program product of claim 32, further comprising a sixth computer-readable program code portion for repositioning the new points until the measured points protrude less than a predetermined engineering tolerance into the second surface so that the shape of the shim is configured to form an interference fit between the first and second bodies.

34. A computer program product for determining the shape of a shim that can be inserted between a first body and a second body, comprising a computer-readable storage medium having computer-readable program code embodied in said medium, the computer-readable program code comprising:

a first computer-readable program code portion for receiving a plurality of measured points that define a surface of the first body;

a second computer-readable program code portion for using an outboard mating surface of the second body and creating a vector passing through respective points of a group of the measured points and normal to the outboard mating surface;

a third computer-readable program code portion for determining, for each point of the group, a distance between the outboard mating surface and a point that is local to the respective point in the group and is most outboard from the outboard mating surface;

a fourth computer-readable program code portion for constructing a plurality of new points with each new point associated with a respective point of the group and displaced the respective distance along the respective vector; and a fifth computer-readable program code portion for realigning the measured points until each point of the group of the measured points is coincident with each new point on the same vector so that the shape of the shim is defined between the plurality of measured points and the outboard mating surface.

35. The computer program product of claim 34, further comprising a computer-readable program code portion for repositioning the new points until the measured points protrude less than a predetermined engineering tolerance into the outboard mating surface so that the shape of the shim is configured to form an interference fit between the first and second bodies.

36. The computer program product of claim 35, further comprising a computer-readable program code portion for constructing the outboard mating surface from a position of a tool locating detail and a known displacement of the outboard mating surface with respect to the tool locating detail.

37. A method of determining a shape of a shim that can be inserted between a first body and a second body, the method comprising:

receiving a plurality of measured points that define a surface of the first body;

performing a maximum material best fit on the plurality of measured points to one side of a second surface of the second body so that the shape of the shim is defined between the plurality of measured points and the second surface which is an engineering surface; and offsetting the second surface by a predetermined engineering tolerance so that the shape of the shim is configured to form an interference fit between the first and second bodies.

38. A computer program product for determining the shape of a shim that can be inserted between a first body and a second body, comprising a computer-readable storage medium having computer-readable program code embodied in said medium, the computer-readable program code comprising:

a first computer-readable program code portion for receiving a plurality of measured points that define a surface of the first body;

a second computer-readable program code portion for performing a maximum material best fit on the plurality of measured points to one side of a second surface of the second body so that the shape of the shim is defined between the plurality of measured points and the second surface which is an engineering surface; and a third computer readable program code portion for offsetting the second surface by a predetermined engineering tolerance so that the shape of the shim is configured to form an interference fit between the first and second bodies.

39. An apparatus for determining a shape of a shim that can be inserted between a first body and a second body, the apparatus comprising:

a plurality of targets positioned at a plurality of shim points on the first body;

a measuring device positioned to measure the plurality of targets and create a plurality of measured points corresponding to the plurality of targets, said plurality of measured points defining a first surface of the first body; and a processing element for receiving the plurality of measured points, said processing element using a second surface and transforming the locations of the measured points with respect to the second surface so that the shape of the shim is defined between the plurality of measured points and the second surface which is an engineering surface.

40. The apparatus of claim 39, wherein the processing element transforms the locations of the measured points by creating a vector passing through each point of a group of the measured points and normal to the second surface, said processing element determining, for each point of the group, a distance between the second surface and a point that is local to the respective point in the group and is most outboard from the second surface, said processing element also constructing a plurality of new points with each new point associated with a respective point of the group and displaced the respective distance along the respective vector and said processing element realigning the measured points until each point of the group of the measured points is coincident with each new point.

41. The apparatus of claim 39, wherein said processing element performs a maximum material best fit on the plurality of measured points to one side of the second surface of the second body.

42. The apparatus of claim 41, wherein said processing element offsets the second surface by a predetermined engineering tolerance so that the shape of the shim is configured to form an interference fit between the first and second bodies.

* * * * *

UNITED STATES PATENT AND TRADEMARK OFFICE
CERTIFICATE OF CORRECTION

PATENT NO. : 6,618,505 B2
DATED : September 9, 2003
INVENTOR(S) : Cork et al.

It is certified that error appears in the above-identified patent and that said Letters Patent is hereby corrected as shown below:

Title page,
Item [*] Notice, should appear as follows:
-- Subject to any disclaimer, the term of this
patent is extended or adjusted under 35
U.S.C. 154(b) by 230 days. --.
Item [74], *Attorney, Agent, or Firm*, "Alson & Bird LLP" should read -- Alston & Bird LLP --.

Signed and Sealed this

Seventeenth Day of February, 2004

JON W. DUDAS
*Acting Director of the United States Patent and Trademark Office*